US008870285B2

(12) United States Patent
Williams et al.

(10) Patent No.: US 8,870,285 B2
(45) Date of Patent: Oct. 28, 2014

(54) CHILD SAFETY SEAT ASSEMBLY

(71) Applicant: Wonderland Nurserygood Company Limited, Central Hong Kong (HK)

(72) Inventors: Bruce L. Williams, Narvon, PA (US); Gregory S. Sellers, Christiana, PA (US); Curtis M. Hartenstine, Birdsboro, PA (US); Nathanael Saint, Elverson, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 0 days.

(21) Appl. No.: 14/027,180

(22) Filed: Sep. 14, 2013

(65) Prior Publication Data
US 2014/0008953 A1    Jan. 9, 2014

Related U.S. Application Data

(63) Continuation of application No. 13/182,091, filed on Jul. 13, 2011, now Pat. No. 8,556,344.

(60) Provisional application No. 61/399,663, filed on Jul. 15, 2010, provisional application No. 61/461,410, filed on Jan. 18, 2011, provisional application No. 61/518,426, filed on May 5, 2011.

(51) Int. Cl.
*B60N 2/26* (2006.01)
*B60N 2/28* (2006.01)

(52) U.S. Cl.
CPC ............ *B60N 2/2821* (2013.01); *B60N 2/2863* (2013.01); *B60N 2/2845* (2013.01); *B60N 2/2875* (2013.01)

USPC .................. 297/256.13; 297/256.16; 297/325

(58) Field of Classification Search
USPC ............ 297/256.13, 256.1, 256.16, 325, 329
See application file for complete search history.

(56) References Cited

U.S. PATENT DOCUMENTS

| 4,615,560 | A | * | 10/1986 | Schaller ........................ 297/130 |
| 4,743,063 | A |   | 5/1988 | Foster, Jr. |
| 4,826,246 | A | * | 5/1989 | Meeker .................... 297/256.15 |
| 4,911,499 | A | * | 3/1990 | Meeker ...................... 297/260.2 |

(Continued)

FOREIGN PATENT DOCUMENTS

| CA | 2773512 A1 | 3/2001 |
| CN | 200948756 Y | 9/2007 |

(Continued)

*Primary Examiner* — David R Dunn
*Assistant Examiner* — Richard Lowry
(74) *Attorney, Agent, or Firm* — David I. Roche; Baker & McKenzie LLP

(57) ABSTRACT

A child safety seat assembly includes a detachable child seat and a base. The child seat has a seatback, and a foremost end opposite to the seat back. The base includes a shell body, an adjustable platform and a latch mechanism. The shell body has a first and a second end edge opposite to each other. The first end edge is at a height that is greater than that of the second end edge. The adjustable platform is operable to releasibly attach with the child seat. The adjustable platform and the child seat attached with each other are movable in unison between a first state where the foremost end is near the first end edge, and a second state where the foremost end is away from the first end edge and below the first end edge of the shell body.

20 Claims, 11 Drawing Sheets

(56) References Cited

U.S. PATENT DOCUMENTS

| | | | |
|---|---|---|---|
| 4,915,446 A * | 4/1990 | Darling et al. | 297/256.14 |
| 4,943,113 A | 7/1990 | Meeker | |
| 4,971,392 A * | 11/1990 | Young | 297/256.12 |
| 5,052,750 A * | 10/1991 | Takahashi et al. | 297/256.13 |
| 5,277,472 A * | 1/1994 | Freese et al. | 297/130 |
| 5,385,387 A | 1/1995 | Kain | |
| 5,494,331 A | 2/1996 | Onishi et al. | |
| 5,551,751 A * | 9/1996 | Sedlack et al. | 297/256.13 |
| 5,722,719 A | 3/1998 | Glomstad | |
| 5,772,279 A | 6/1998 | Johnson, Jr. | |
| 5,890,762 A | 4/1999 | Yoshida | |
| 6,017,088 A | 1/2000 | Stephens et al. | |
| 6,030,047 A | 2/2000 | Kain | |
| 6,070,890 A | 6/2000 | Haut et al. | |
| 6,367,875 B1 | 4/2002 | Bapst | |
| 6,454,350 B1 | 9/2002 | Celestina-Krevh et al. | |
| 6,793,283 B1 | 9/2004 | Sipos | |
| 6,857,700 B2 * | 2/2005 | Eastman et al. | 297/250.1 |
| 6,863,345 B2 | 3/2005 | Kain | |
| 7,073,859 B1 | 7/2006 | Wilson | |
| 7,163,265 B2 | 1/2007 | Adachi | |
| 7,387,336 B2 | 6/2008 | Sakumoto | |
| 7,513,512 B2 | 4/2009 | Yoshie et al. | |
| 7,819,472 B2 | 10/2010 | Hutchinson et al. | |
| 8,585,143 B2 * | 11/2013 | Xiao | 297/256.16 |
| 2002/0113469 A1 | 8/2002 | Stern et al. | |
| 2004/0207241 A1 | 10/2004 | Sedlack | |
| 2005/0110318 A1 | 5/2005 | Meeker et al. | |
| 2005/0264062 A1 * | 12/2005 | Longenecker et al. | 297/250.1 |
| 2006/0250005 A1 * | 11/2006 | Keegan et al. | 297/256.13 |
| 2006/0261651 A1 | 11/2006 | Nolan et al. | |
| 2009/0273216 A1 | 11/2009 | Barger | |
| 2009/0295207 A1 | 12/2009 | Zink et al. | |
| 2010/0007187 A1 | 1/2010 | Hutchinson et al. | |
| 2012/0261960 A1 * | 10/2012 | Heisey et al. | 297/256.1 |

FOREIGN PATENT DOCUMENTS

| | | |
|---|---|---|
| CN | 201124778 Y | 10/2008 |
| CN | 101311029 A | 11/2008 |
| CN | 201151354 Y | 11/2008 |
| EP | 0164909 A3 | 12/1985 |
| EP | 0609889 A1 | 2/1994 |
| EP | 0631903 B1 | 10/1996 |
| EP | 0822115 A3 | 10/1998 |
| EP | 0970842 A1 | 1/2000 |
| EP | 1110807 A1 | 6/2001 |
| EP | 2228253 A2 | 9/2010 |
| FR | 2741847 A1 | 6/1997 |
| GB | 2202433 A | 9/1988 |
| GB | 2350289 A | 11/2000 |
| GB | 2362093 A | 11/2001 |
| GB | 2444833 A | 6/2008 |

* cited by examiner

CHILD SAFETY SEAT ASSEMBLY

CROSS-REFERENCE TO RELATED APPLICATIONS

This application is a Continuation of U.S. patent application No. 13/182,091 filed on Jul. 13, 2011, which respectively claims priority to U.S. Provisional Patent Application No. 61/399,663 filed on Jul. 15, 2010; U.S. Provisional Patent Application No. 61/461,410 filed on Jan. 18, 2011; and U.S. Provisional Patent Application No. 61/518,426 filed on May 5, 2011, all of which are incorporated herein by reference.

BACKGROUND OF THE INVENTION

1. Field of the Invention

The present invention relates to child seat assemblies that include a child seat and a base.

2. Description of the Related Art

Conventionally, an automobile vehicle has seatbelts provided at the front and rear seats. The seatbelt generally includes shoulder and lap straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. Therefore, safety legislations require the use of a child safety seat for seating a young child in a vehicle. The seatbelt of the vehicle can be used to secure the child safety seat which has a harness more adapted to restrain the young child.

The child safety seat can include a child seat and a base connected underneath the child seat. To facilitate the use of the child seat, attachment structures may be provided to allow the child seat to attach with and removed from the base as desired. While the conventional attachment structure can effectively fasten the seat with the base, it may also be desirable to permit adjustment of the child seat relative to the base to suit the age and size of the child. For example, infant child safety seats currently on the market are designed to accommodate infants from birth to 12 months, and lack the adjustments needed to comfortably and conveniently secure a 24-month old child. One of the biggest problems with current rearward facing seats is the lack of leg room provided as the child grows. Many parents may contribute the lack of leg room as the main reason for changing their child to a forward facing seat.

Therefore, there is a need for a child safety seat assembly that can permit more adequate adjustment of the leg room, and address at least the foregoing issues.

SUMMARY

The present application describes a child safety seat assembly including a detachable child seat and a base. The child seat has a seatback, and a foremost end opposite to the seat back. The base includes a shell body, an adjustable platform and a latch mechanism. The shell body has a first and a second end edge opposite to each other, a bottom adapted to provide stable resting on a support surface, and an upper surface extending between the first and second end edges of the shell body, wherein the first end edge is at a height relative to the bottom that is greater than that of the second end edge. The adjustable platform is assembled with the shell body and is operable to releasibly attach with the child seat, wherein the adjustable platform and the child seat attached with each other are movable in unison along the upper surface between a first state where the foremost end of the child seat is at a first position near the first end edge of the shell body, and a second state where the foremost end of the child seat is at a second position away from the first end edge of the shell body and lying below the first position and the first end edge of the shell body. The latch mechanism is disposed between the upper surface of the shell body and the adjustable platform, wherein the latch mechanism is operable to lock the adjustable platform with the shell body in any of the first and second states.

DETAILED DESCRIPTION OF THE EMBODIMENTS

Figure 1:
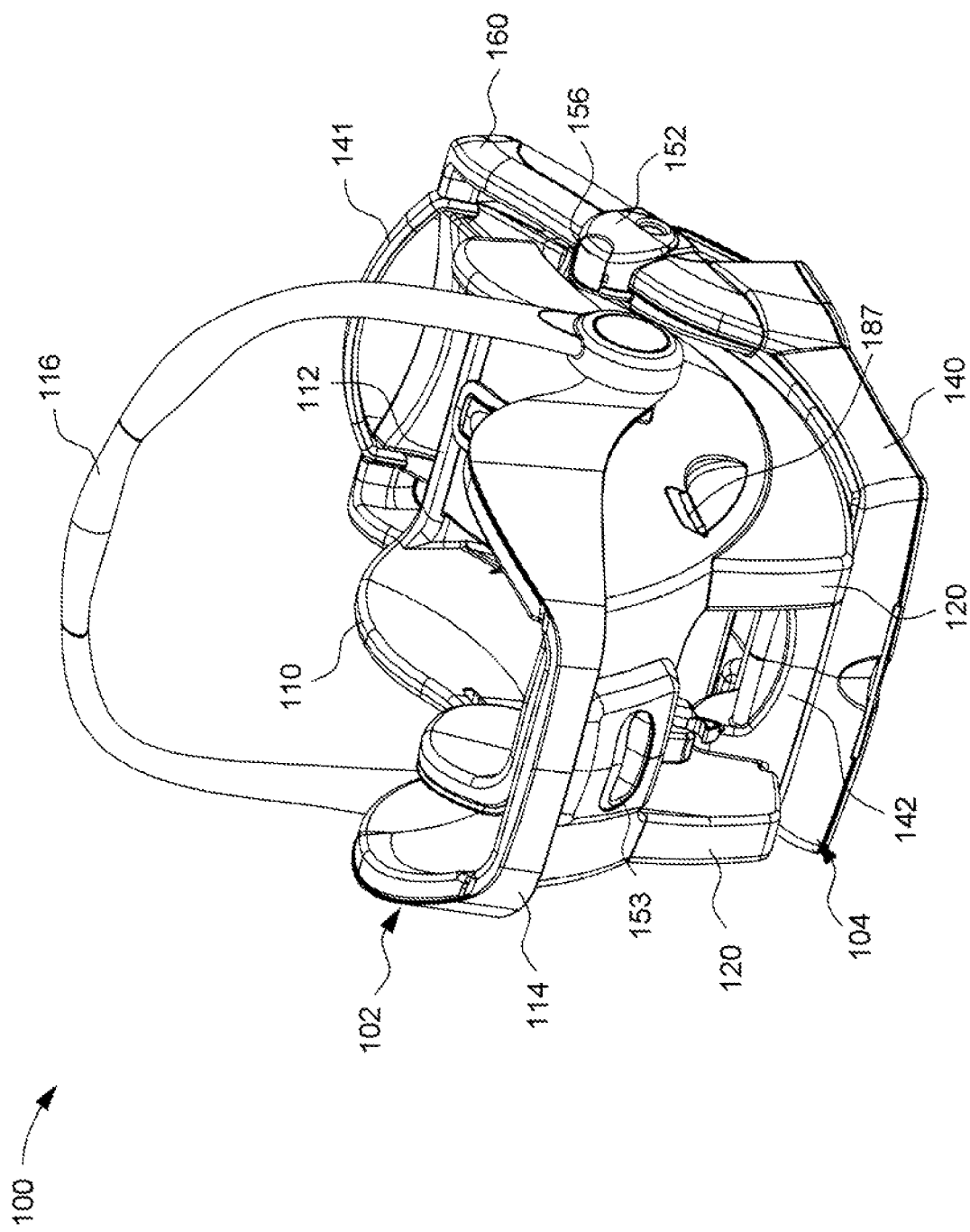
FIG. 1 is a perspective view illustrating an embodiment of a child safety seat assembly.

FIG. 1 is a perspective view illustrating an embodiment of a child safety seat assembly 100. The child safety seat assembly 100 includes a child seat 102 and a base 104. The child seat 102 can include a seat shell 110 having a seat portion 112 and a seatback 114. The seat shell 110, including the seat portion 112 and the seatback 114, can be formed in a single body by plastic molding. A handle 116 can be pivotally connected with two sides of the seat shell 110 to facilitate its carrying. In use, the child seat 102 can be either removed from the base 104, or attached therewith as shown in FIG. 1.

Figure 2:
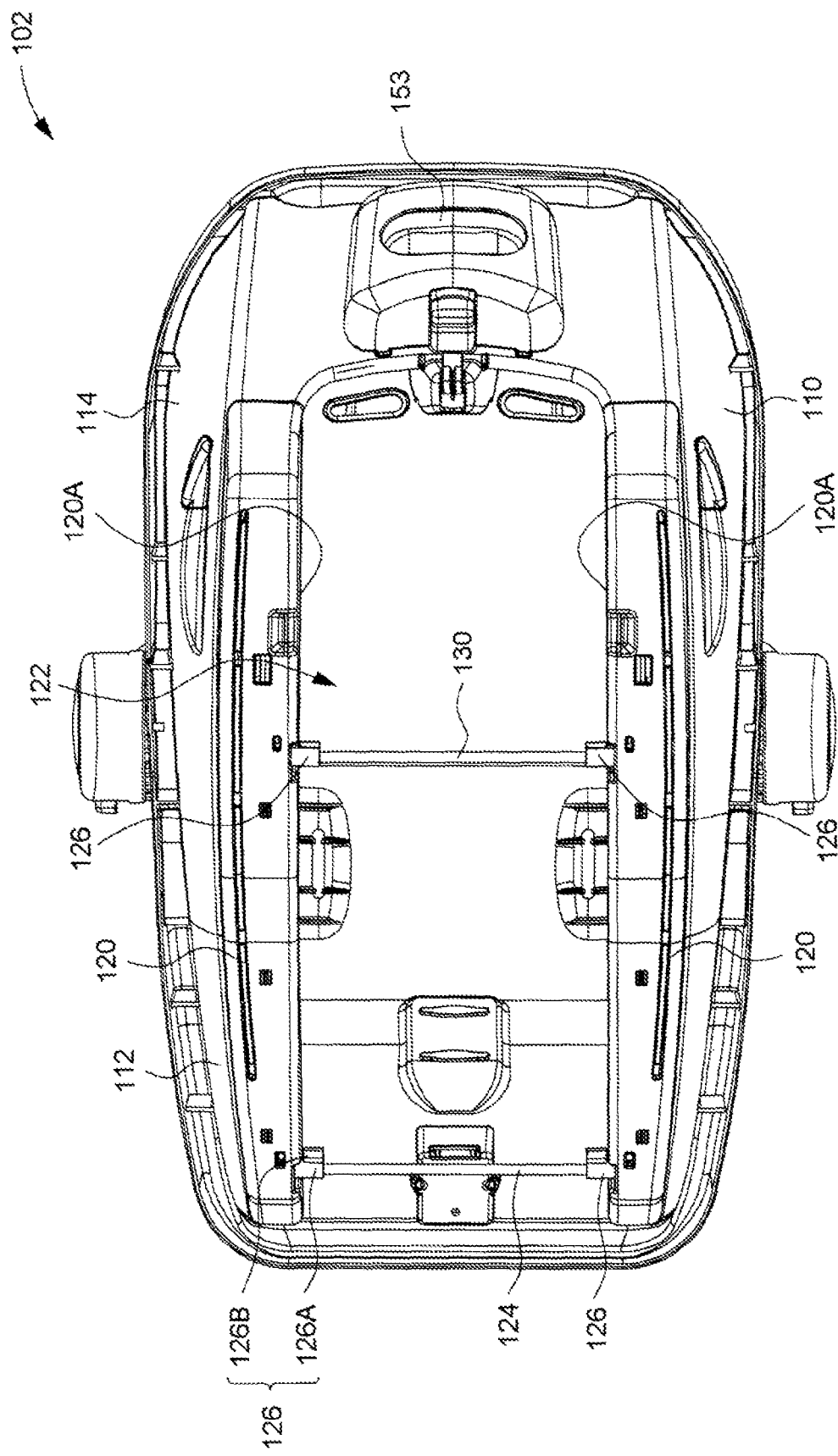
FIG. 2 is a bottom view of the child seat shown in FIG. 1.

FIG. 2 is a bottom view of the child seat 102. A bottom of the child seat 102 can include two protruding rails 120, and a central recessed region 122 delimited between the two rails 120. The rails 120 can be formed at the underside of the seat portion 112, and extend to the rear of the seatback 114. A first transverse shaft 124 can be pivotally mounted between the rails 120 across the recessed region 122 at a first position adjacent to a front of the child seat 102. Two latches 126 can be respectively provided at two opposite end portions of the first transverse shaft 124, adjacent to the opposite inner sidewalls 120A of the rails 120. Each of the latches 126 can be formed as a sleeve 126A that can be affixed around the transverse shaft 124 and is provided with a radial engagement extension 126B oriented upward. A second transverse shaft 130 can be pivotally mounted between the rails 120 across the recessed region 122 at a second position behind the first transverse shaft 124. The second transverse shaft 130 is parallel to the first transverse shaft 124, and can have two opposite end portions mounted with latch elements 126 similar to those provided on the first transverse shaft 124. While the latches 126 have been described as parts assembled on the transverse shafts 124 and 130, alternate embodiments can also have the latches respectively formed integral with the first and second transverse shafts 124 and 130. The latches 126 exposed downward in the recessed region 122 can thereby form four attachment points disposed in two symmetrical pairs adjacent to the inner sidewalls 120A of the left and right side rails 120.

Figure 3:
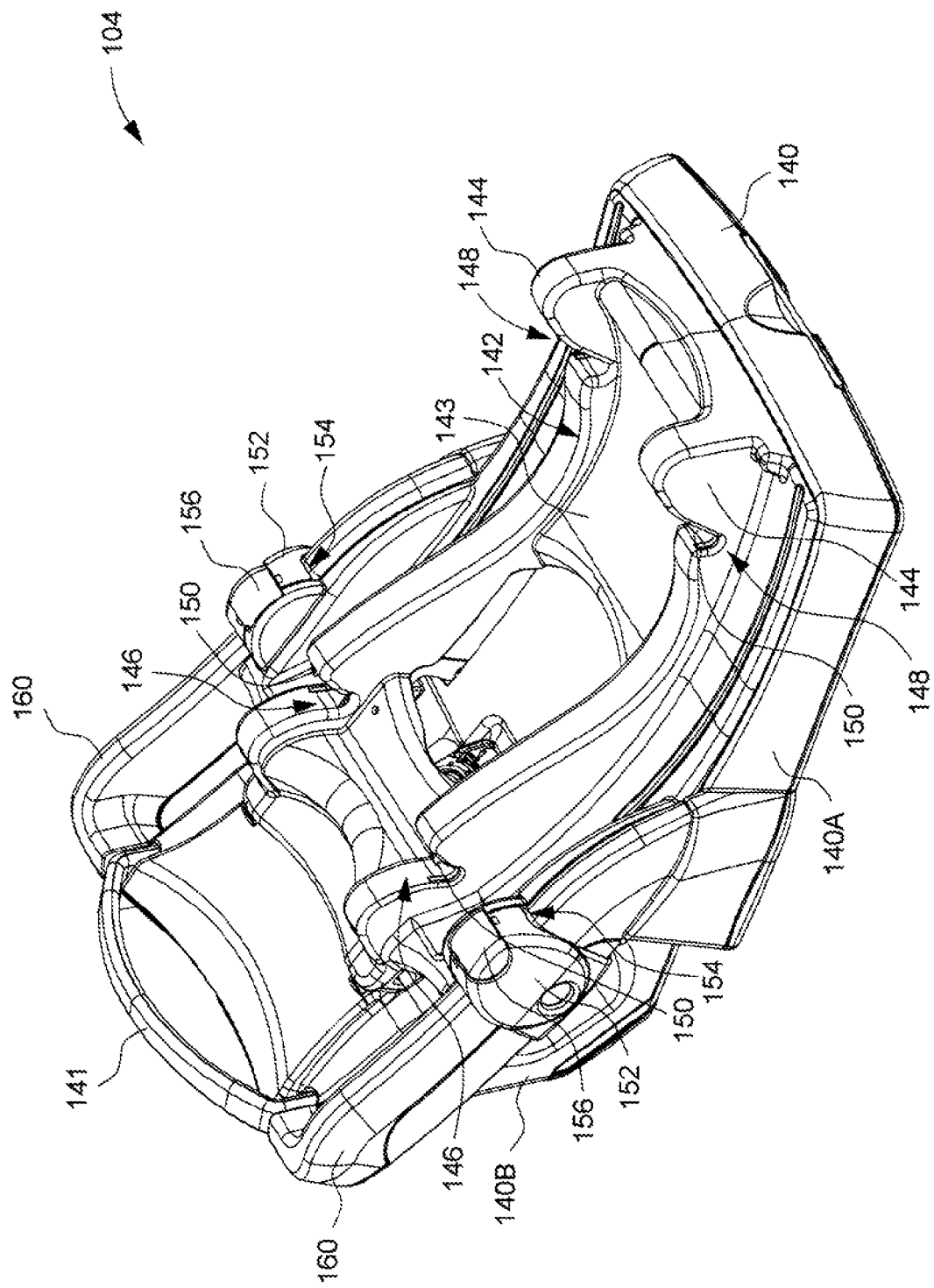
FIG. 3 is a schematic view of the base shown in FIG. 1.

FIG. 3 is a schematic view of the base 104. The base 104 can include a shell body 140, and an adjustable platform 142 mounted with an upper side of the shell body 140. The shell body 140 can have a first portion 140A having an enlarged bottom to provide stable resting support, and a second portion 140B extending upward at an angle from the first portion 140A at an end of the shell body 140. The second portion 140B can include an adjustable extension 141, which may be formed as a retractable plate. The adjustable extension 141 can be operable to retract inside a receiving region in the second portion 140B, or deploy outward to upwardly extend the length of the second portion 140B. When the child seat 102 is installed on the base 104, this adjustable extension 141 may be deployed to be conveniently used as footrest for the child.

The adjustable platform 142 can include a support body 143 movably assembled at an upper side of the shell body 140. The support body 143 can have two protruding guide rails 144 that extend parallel in an axial direction of the base 104 and are adapted to receive the placement of the child seat 102. The guide rails 144 are symmetric in construction, including first grooves 146, and second grooves 148 axially spaced apart from the first grooves 146. The first and second grooves 146 and 148 can be formed as recesses from the upper surfaces of the guide rails 144, and are sized to receive and hold the end portions of the transverse shafts 124 and 130 provided with the latches 126. Moreover, each of the first and second grooves 146 and 148 can include catches 150 with which the latches 126 can engage to lock the child seat 102 with the adjustable platform 142. In one embodiment, the catches 150 may be formed at a same side in each of the grooves 146 and 148, for example on the left side surface as shown in FIG. 3.

Figure 4:
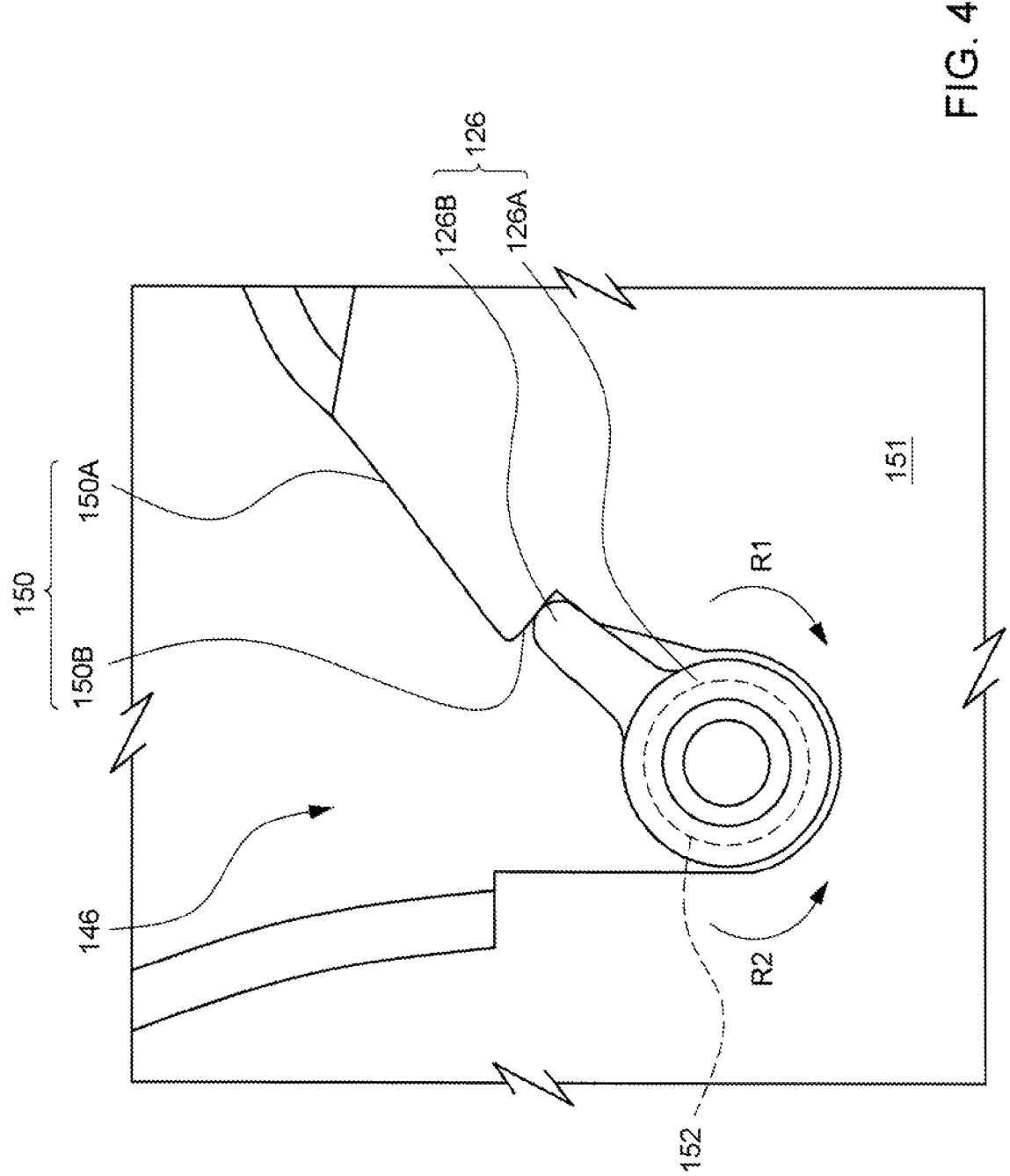
FIGS. 4 and 5 are enlarged views illustrating how a plurality of latches provided on the child seat respectively engage with catches provided on an adjustable platform of the base.
Figure 5:
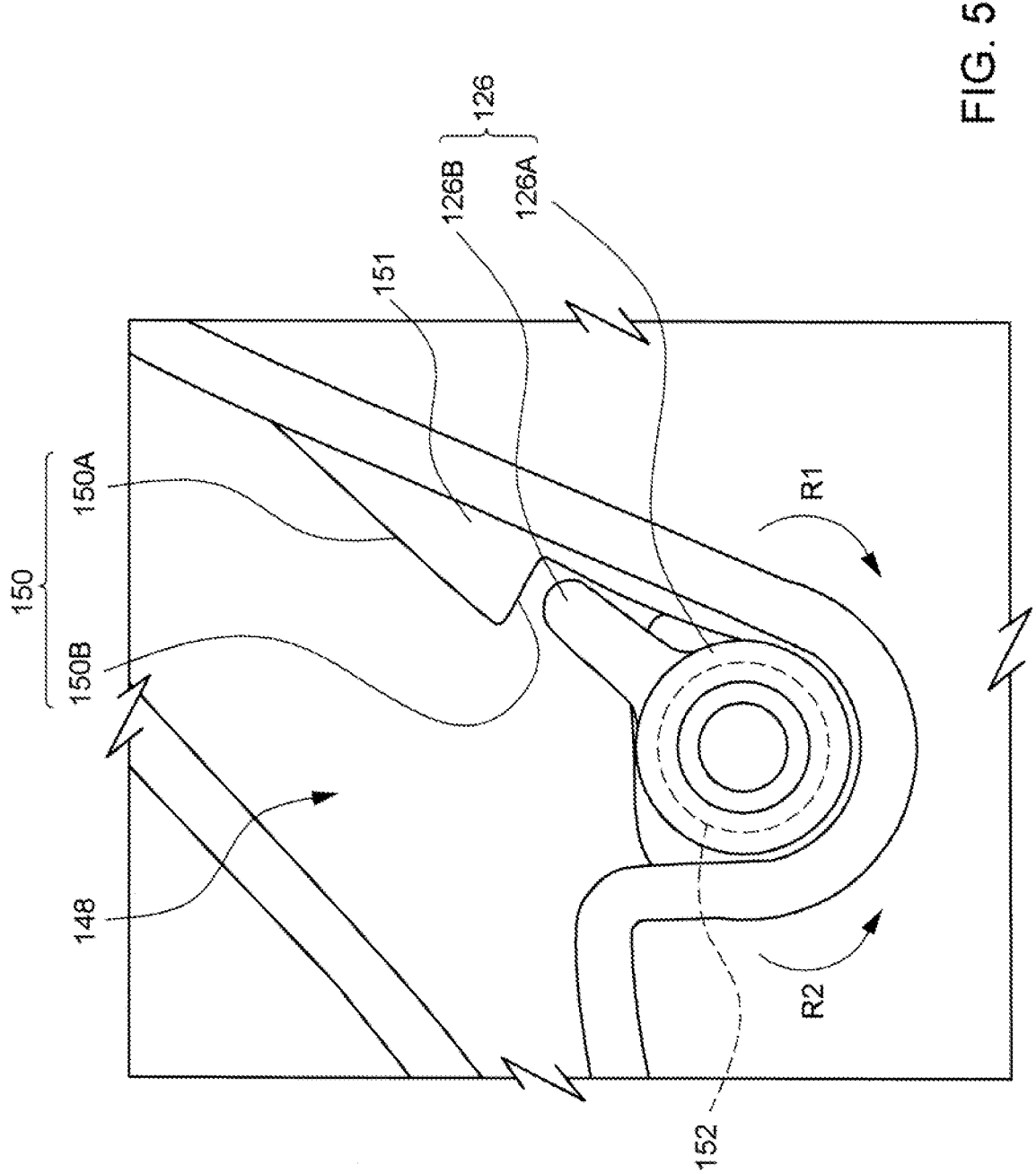

FIGS. 4 and 5 are enlarged views illustrating how the latches 126 of the child seat 102 can respectively engage with the catches 150 in the first and second grooves 146 and 148 of the adjustable platform 142. Each of the catches 150 can be formed on a holder plate 151 having a hook-shaped portion comprised of an upper angled surface 150A and a lower surface 150B. When the child seat 102 is disposed on the adjustable platform 142, the upper angled surface 150A can respectively push away the engagement extension 126B so that each of the latches 126 can be received in the associated first and second grooves 146 and 148. Once each latch 126 is held in the associated groove, forward and backward movements as well as lateral displacements of the child seat 102 relative to the base 104 can be blocked. A torsion spring 152 mounted with the latch 126 (shown with phantom lines) can then bias the latch 126 to rotate about the transverse axis defined by the transverse shaft 130 in a first direction R1 to place the engagement extension 126B in locking engagement against the lower surface 150B of the catch 150, whereby upward removal of the child seat 102 is also blocked. The child seat 102 can be thereby locked in position with the base 104. To unlock the child seat 102, a release button 153 (better shown in FIGS. 1 and 2) can be operated to drive rotation of the latches 126 in the direction R2 to disengage the engagement extensions 126B from the lower surface 150B of the catches 150. The child seat 102 then can be upwardly removed from the base 104.

Referring again to FIG. 3, the adjustable platform 142 can be movably mounted with the shell body 140 for back and forth movements along a lengthwise axis of the base 104. This allows to desirably adjust the child seat 102 back and forth to suit the child's needs. For this purpose, the shell body 140 can include two elongated arms 160 that extend lengthwise symmetrically at the left and right sides of the second portion 140B. Left and right sides of the adjustable platform 142 can be provided with two sockets 152 that include guide slots 154 through which the arms 160 are respectively mounted. The sockets 152 can be movable along the arms 160 as the adjustable platform 142 is adjusted back and forth relative to the shell body 140. In addition, each of the sockets 152 can be provided with a release button 156 that is connected with a latch mechanism operable to securely hold the adjustable platform 142 at multiple positions. One or both of the two release buttons 156 can be operated to unlock the latch mechanism and permit movements of the adjustable platform 142 relative to the shell body 140. One embodiment of the latch mechanism is described hereafter with reference to FIGS. 6 through 8.

Figure 6:
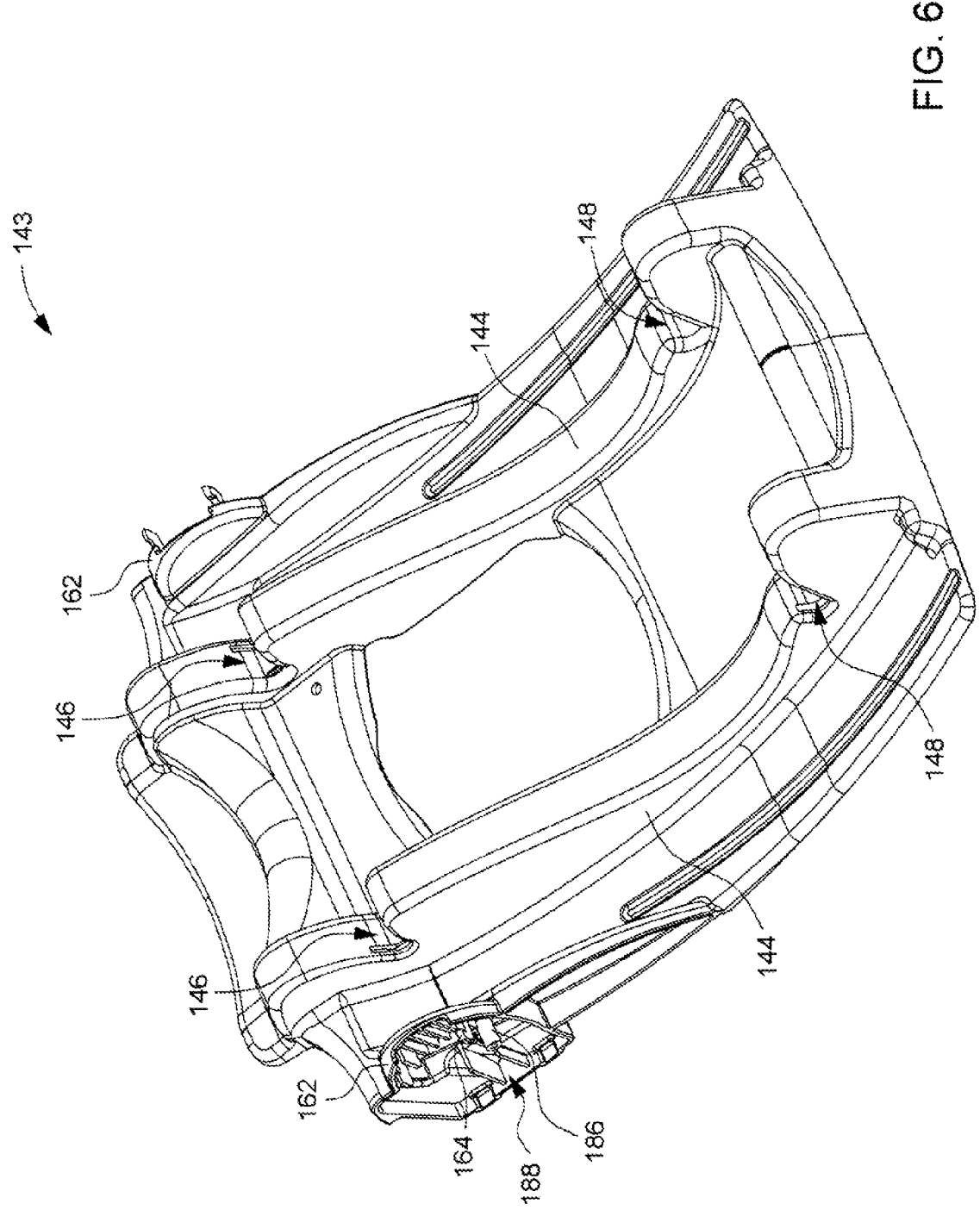
FIG. 6 is a schematic view illustrating the adjustable platform of the base.
Figure 7:
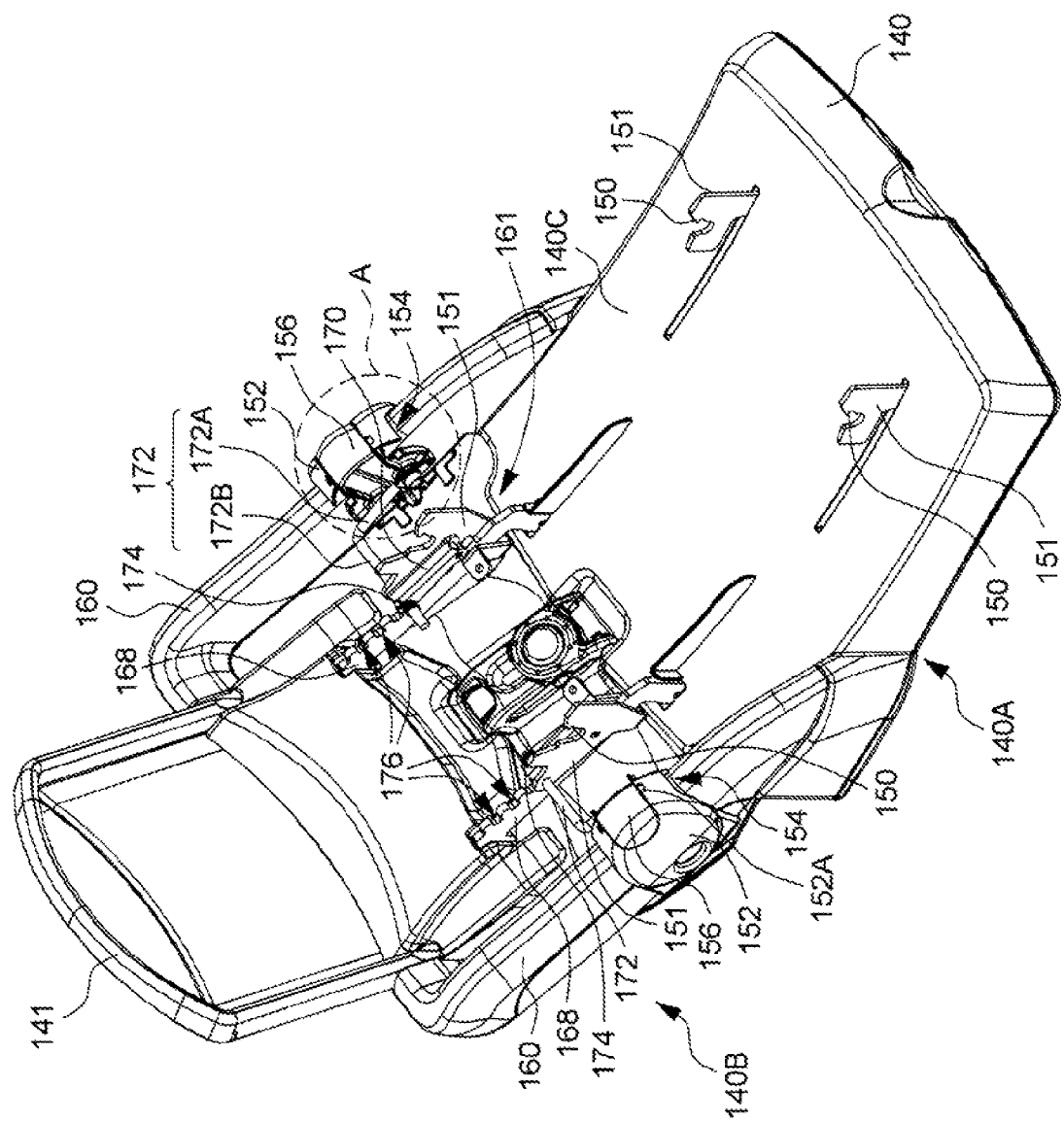
FIG. 7 is a schematic view illustrating a latch mechanism provided in the base.
Figure 8:
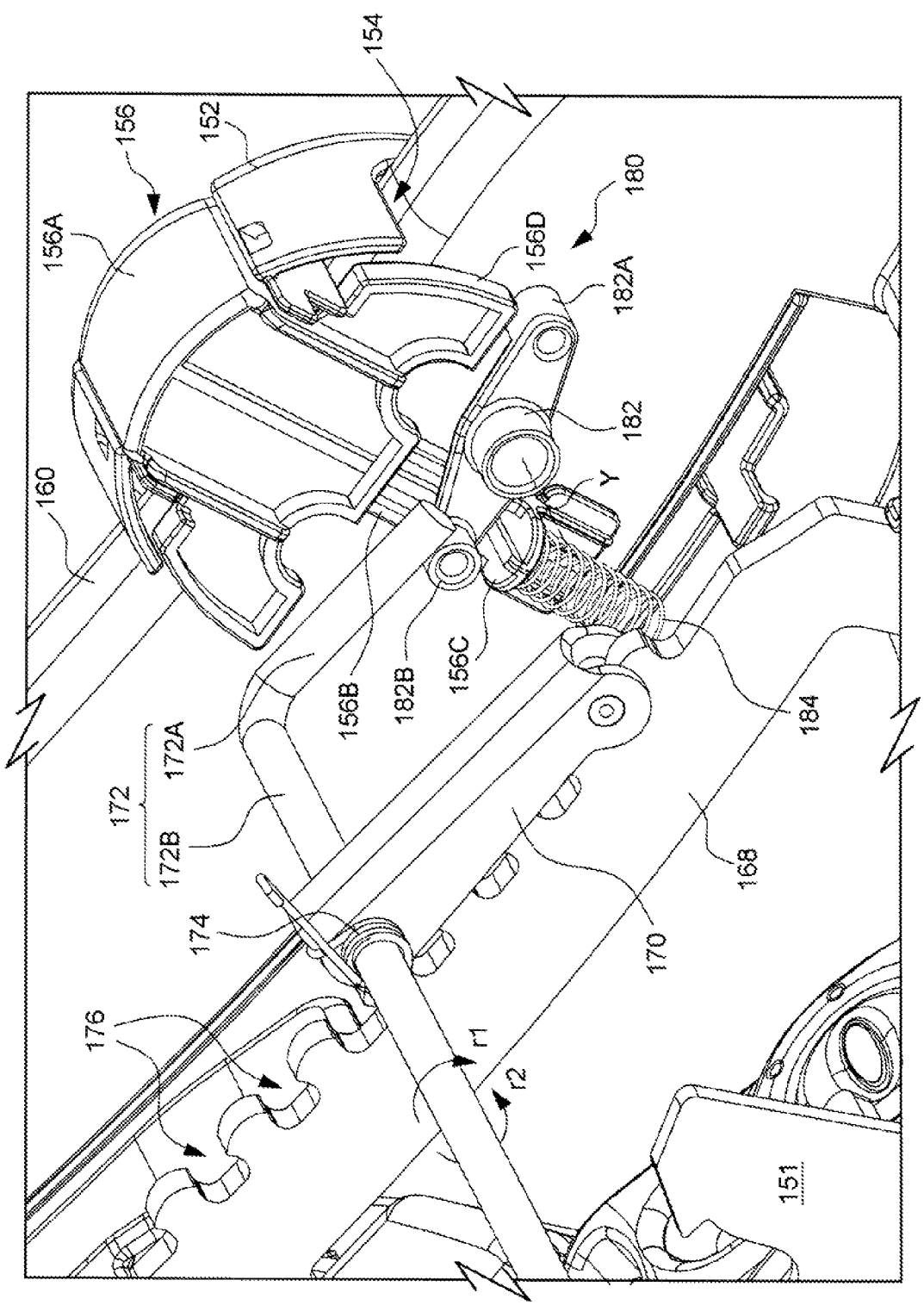
FIG. 8 is an enlarged view of portion A shown in FIG. 7.

FIG. 6 is a schematic view illustrating a construction of the support body 143, FIG. 7 is a schematic view illustrating a latch mechanism 161 provided between the shell body 140 and the adjustable platform 142 (for clarity, the support body 143 of the adjustable platform 142 is omitted in FIG. 7), and FIG. 8 is an enlarged view of portion A in FIG. 7 to illustrate a release mechanism 180 operable to unlock the latch mechanism 161. Referring to FIGS. 6 and 7, the support body 143 can be movably mounted on a guide surface 140C of the shell body 140. The support body 143 can be integrally formed by plastic molding having an upper side provided with the guide rails 144, and left and right sides provided with coupling shells 162. Each of the coupling shells 162 can have an inner side provided with one or more snap finger 164. When the adjustable platform 142 is assembled with the shell body 140, the support body 143 can be placed between the arms 160 of the shell body 140, and the sockets 152 can be respectively affixed with the coupling shells 162 from the outer side of the arms 160 by engagement of the snap finger 164 with associated openings 152A on the sockets 152.

As better shown in FIG. 7, the holder plates 151 can be respectively affixed with the support body 143 at an inner side of the guide rails 144 to provide the catches 150 in the recessed grooves 146 and 148. Some of these holder plates 151 can be used to connect certain parts of the latch mechanism 160 as described hereafter.

Referring to FIGS. 7 and 8, the latch mechanism 161 can include one or more elongated racks 168 (two racks are shown), one or more latching elements 170 adapted to engage with the racks 168, one or more bar linkage 172 respectively coupled with the latching elements 170, and one or more spring 174. The racks 168 can be affixed on the guide surface 140C of the shell body 140 at two parallel positions below the support body 143. Each of the racks 168 can have an elongated shape, and include a plurality of locking positions distributed lengthwise and adapted to engage with one associated latching element 170. In one embodiment, the locking positions can be formed by grooves 176 formed oriented upward in the rack 168. However, other structures may be possible. For example, the locking positions may also be formed as protrusions adapted to receive the engagement of the latching element 170.

The latching elements 170 can be pivotally assembled with the support body 143 of the adjustable platform 142, and are operable to engage with any of the grooves 176 to lock the adjustable platform 142 in position. In this embodiment, the latching elements 170 can be pivotally connected with the support body 143 via the bar linkages 172, respectively. In one embodiment, each bar linkage 172 can have a generally L-shape including a side segment 172A, and a transverse segment 172B that can extend generally parallel to the width direction of the base 104. Each latching element 170 can be affixed with the transverse segment 172B of one bar linkage 172 at a position proximate to one associated rack 168. The transverse segment 172B can be pivotally connected with one holder plate 151 that is affixed adjacent to the recessed groove 146. Each bar linkage 172 can be thereby operable independently to rotate about a transverse axis relative to the support body 143 so as to drive locking and unlocking rotations of the associated latching element 170. It is worth noting that alternate embodiments may also have the transverse segments 172B of the two bar linkages 172 joined with each other so as to form a unitary bar linkage. With this construction, the two latching elements 170 can be driven in a concurrent manner via the unitary bar linkage for locking and unlocking operations.

The spring 174 can be a torsion spring mounted around the transverse segment 172B of each bar linkage 172 and having a first end anchored with the support body 143, and a second end anchored with the transverse segment 172B or the latching element 170. The biasing action of the spring 174 can urge the latching element 170 to engage with a corresponding groove 176. To disengage the latching elements 170 from the grooves 176, the two release buttons 156 can be respectively operated to drive reverse rotation of the linkages 172 via two release mechanisms 180 (better shown in FIG. 8) interacting with the latching elements 170.

Referring to FIG. 8, the release mechanism 180 can include the release button 156, a lever 182, and a spring 184. This same release mechanism 180 can be respectively assembled between the socket 152 and the coupling shell 162 of the support body 143 (better shown in FIG. 6) at the left and right sides of the adjustable platform 142. The release button 156 is assembled with the socket 152 for upward and downward movements. The release button 156 can have a shape that partially wraps around the associated arm 160, including an actuator portion 156A positioned above the arm 160, and an extension 156B lying at an inner side of the arm 160 adjacent to one side segment 172A of the bar linkage 172. The extension 156B can have a protruding lip 156C to which the spring 184 is connected along the direction of displacement of the release button 156, and a side shoulder portion 156D.

Referring to FIGS. 6 and 8, the lever 182 can be pivotally connected with a pin 186 protruding from an inner side of the coupling shell 162. The lever 182 can have a have a first end 182A located below the shoulder portion 156D, and a second end 182B that can come into contact against one side segment 172A of the bar linkage 172 at a side opposite to the first end 182A. The lever 182 can be thereby driven by either of the release button 156 and the bar linkage 172 in rotation about a pivot axis Y defined by the pin 186.

The spring 184 can be restrainedly positioned in a guide slot 188 formed in the coupling shell 162. The spring 184 can have a first end anchored against a bottom surface of the coupling shell 162, and a second end anchored with the lip 156C of the release button 156. The spring 184 can be operable to bias the release button 156 upward.

With the above construction, the release mechanisms 180 can be movable with the support body 143 when the platform 142 is adjusted in position. Each of the release mechanisms 180 can be independently operated to unlock the associated latching element 170. In case the two latching elements 170 are coupled with each other via a unitary bar linkage, only one release mechanism 180 can be actuated to unlock the latch mechanism 160.

Exemplary operation of the adjustable platform 142 is described hereafter with reference to FIGS. 3, 7 and 8. The springs 174 can respectively bias the latching elements 170 to rotate in a first direction r1 so that end portions of the latching elements 170 can engage with a corresponding pair of the grooves 176 on the racks 168. The adjustable platform 142 can be thereby locked in place with the shell body 140.

To modify the position of the adjustable platform 142, the two release buttons 156 can be simultaneously pressed downward. As the release buttons 156 move downward, the springs 184 are compressed, and the shoulder portions 156D of the release buttons 156 can respectively press against the first ends 182A to drive rotation of the levers 182 about their respective pivot axes Y. Each rotating lever 182 in turn causes the associated bar linkage 172 to rotate in a second direction r2 owing to the contact between the second end 182B of the lever 182 and the side segment 172A of the bar linkage 172, which in turn can cause each latching element 170 to rotate in the same direction r2 and disengage from the associated rack 168. Being unlocked, the adjustable platform 142 then can be moved forward or rearward along the guide surface 140C of the shell body 140. It is worth noting that in case the two latching elements 170 are coupled with each other (e.g., by joining the two bar linkage 172 to form a unitary linkage), only one of the two release buttons 156 can be pressed downward to drive concurrent disengagement of the two latching elements 170 and unlocking of the adjustable platform 142.

In one embodiment, the guide surface 140C on which the support body 143 rests can extend substantially along the lengthwise axis of the shell body 140. Accordingly, the adjustable platform 142 can be moved along the guide surface 140C to effectively increase or reduce a distance between the adjustable platform 142 and the second portion 140B. The guide surface 140C can also have a curved profile to form an arc-shaped slope that rises gently and continuously from the first portion 140A in a direction toward the second portion 140B. The profile of the elongated arms 160 can also be curved to generally match with the slope of the guide surface 140C. Accordingly, the general inclination of the adjustable platform 142 can be changed as it slides along the guide surface 140C.

Once the platform 142 is adjusted to a desired position, the springs 174 can bias the latching elements 170 to rotate in the first direction r1 to engage with a corresponding pair of the grooves 176 on the racks 168. In the meantime, the springs 184 can push the release buttons 156 upward to recover their initial state.

Figure 9:
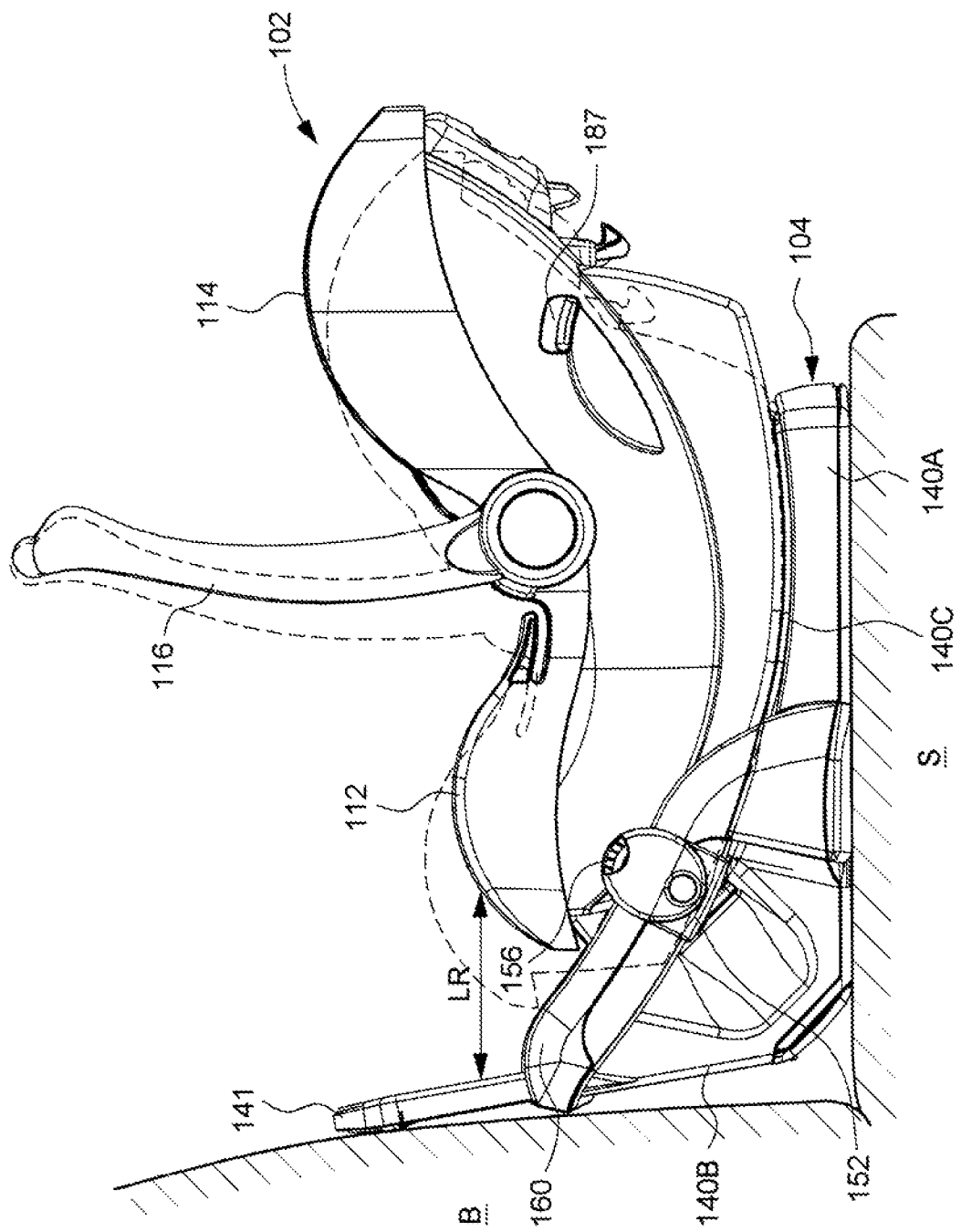
FIG. 9 is a side view illustrating the base installed with the child seat.

In conjunction with FIG. 1, FIG. 9 is a side view illustrating the base 104 installed with the child seat 102. When the child seat 102 is installed oriented toward the second portion 140B (i.e., the front of the child seat 102 is oriented toward the second portion 140B), a leg room LR for placement of the child's legs can be defined between the front edge of the seat portion 112 and the second portion 140B of the shell body 140 visible in front of the seat portion 112. This assembly of the child seat 102 with the base 104 can be installed on a vehicle seat S in a rearward facing configuration, i.e., the second portion 140B is placed adjacent to the seatback B of the vehicle seat S and the front of the child seat 102 is facing rearward. To adjust the leg room LR in accordance with the size of the child's legs, the child seat 102 can be axially moved along a path substantially parallel to the guide surface 140C of the base 104 via the adjustable platform 142 for modifying the distance between the seat portion 112 and a region of the second portion 140B in front of the seat portion 112. For example, the adjustable platform 142 and the child seat 102 can be moved toward the second portion 140B to reduce the leg room LR (as shown with phantom lines), and away from the second portion 140B to increase the leg room LR. Owing to the configuration of the guide surface 140C, the adjustable platform 142 and the entire child seat 102 can be effectively displaced along the support surface of the vehicle seat S on which the base 104 rests, which allows to substantially increase the leg room LR if needed. Owing to the curved shape of the guide surface 140C, the general inclination of the child seat 102 can also be modified when the leg room LR is adjusted: the rearward inclination of the child seat 102 can increase as the child seat 102 is adjusted toward the second portion 140B of the shell body 140, and reduced when the child seat 102 is displaced away from the second portion 140B. Dual-zone recline indicators 187 can also be provided on both sides of the child seat 102 to indicate developmentally-appropriate ranges of use. The use of the child seat assembly can be therefore facilitated.

Figure 10:
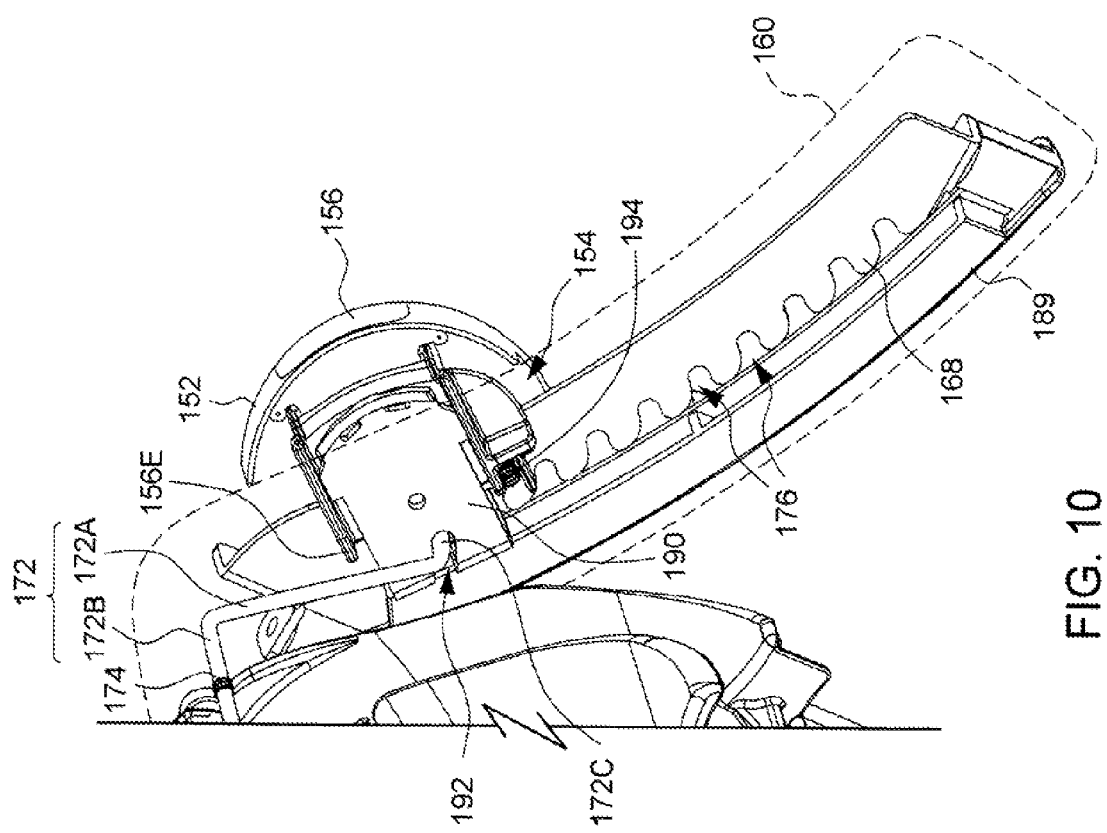
FIGS. 10 and 11 are schematic views illustrating a variant construction of the aforementioned latch and release mechanisms.
Figure 11:
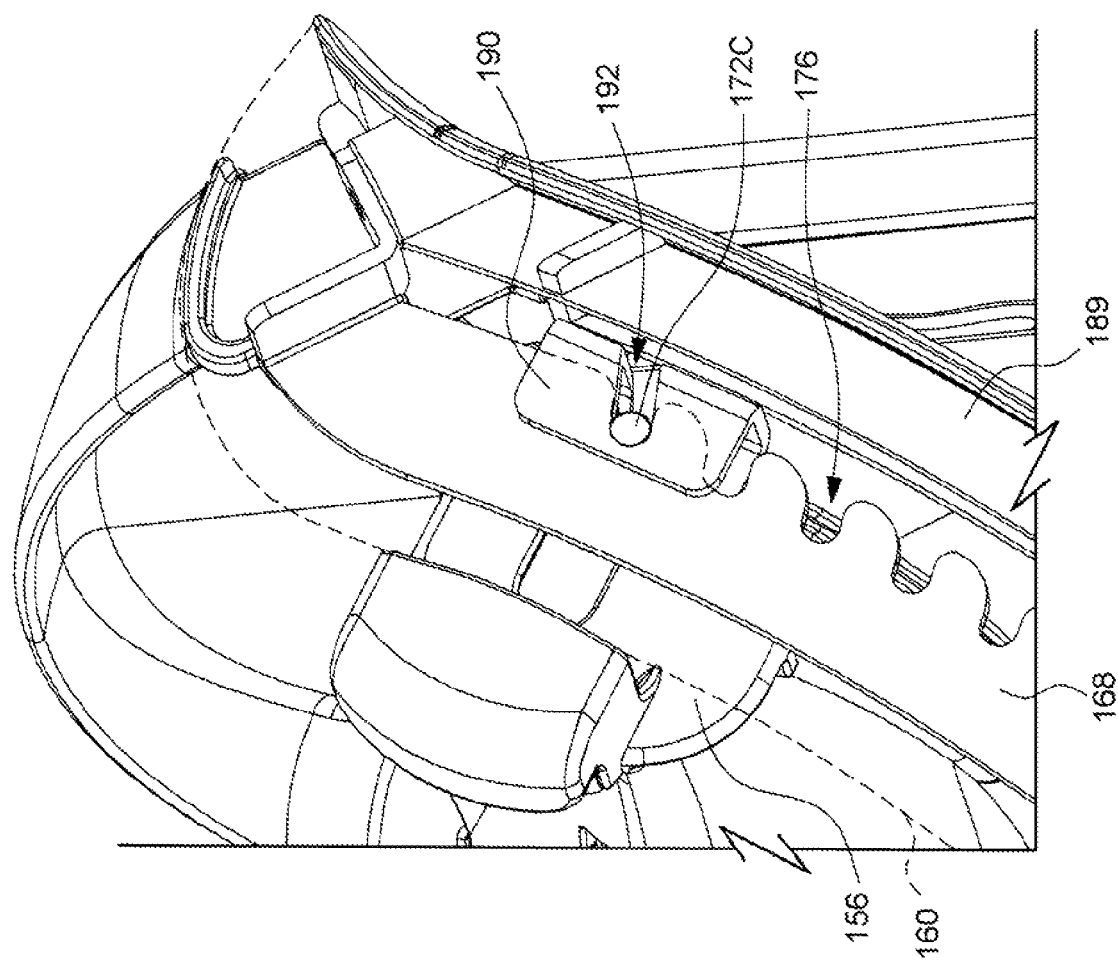

It will be understood that many variations or modifications to the aforementioned constructions can be possible. FIGS. 10 and 11 are schematic views illustrating a variant construction of the aforementioned latch and release mechanisms. For clarity, the representation of the support body 143 is omitted and the arm is shown with dotted lines in FIGS. 10 and 11. Moreover, the socket 152 is omitted in FIG. 11. In this embodiment, each of the arms 160 of the shell body 140 can have an inner cavity. Each rack 168 can be respectively affixed in the inner cavity of one arm 160 via a bracket 189 with the grooves 176 oriented downward. In this embodiment, the side segment 172A of each bar linkage 172 (which is pivotally connected with the support body 143 like described previously) can include an outer lateral extension that forms a latching element 172C adapted to engage with any of the grooves 176 from the underside of the rack 168. The latching element 172C can be guided in movement through a slot 192 of a guide plate 190 affixed with the support body 143 at a location adjacent to the release button 156. In this embodiment, no lever 182 (as shown in FIG. 8) is provided. When the release button 156 is pressed downward, a side edge 156E of the release button 156 can directly contact with the side segment 172A and drive rotation of the bar linkage 172 to disengage the latching element 172C from the rack 168. When the pressure on the release button 156 is removed, the spring 174 can bias the bar linkage 172 to rotate in a reverse direction to engage the latching element 172C with the rack 168 for locking the adjustable platform 142 in position. A spring 194 may also be connected with the release button 156 to bias it upward when the latching element 172C engages with the rack 168.

At least one advantage of the structures described herein is the ability to provide a base that allows to conveniently adjust the recline angle of the child seat and the leg room at the same time without changing the attachment to the vehicle. This can be achieved by providing a base that can have an adjustable platform adapted to hold the child seat, and operable to modify the axial position of the child seat relative to the base to adjust the leg room in accordance with the size of the child's legs. The adjustable platform can be operated with a simple push-button mechanism conveniently provided on both sides of the base.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child safety seat assembly comprising:
   a detachable child seat having a seatback, and a foremost end opposite to the seatback; and
   a base including:
      a shell body having a first and a second end edge opposite to each other, a bottom adapted to provide stable resting on a support surface, and an upper surface extending between the first and second end edges of the shell body, wherein the first end edge is at a height relative to the bottom that is greater than that of the second end edge, and the shell body extends along a lengthwise axis between the first and second end edges;
      an adjustable platform assembled with the shell body for displacement along the lengthwise axis relative to the shell body and operable to releasibly attach with the child seat, wherein the adjustable platform and the child seat attached with each other are movable in unison along the upper surface between a first state where the foremost end of the child seat is at a first position near the first end edge of the shell body, and a second state where the foremost end of the child seat is at a second position away from the first end edge of the shell body and lying below the first position and the first end edge of the shell body, a child when sitting on the child seat facing the foremost end, and the foremost end of the child seat in the first and second states remaining between the first and second end edges of the shell body along the lengthwise axis; and
      a latch mechanism disposed between the upper surface of the shell body and the adjustable platform, wherein the latch mechanism is operable to lock the adjustable platform with the shell body in any of the first and second states.

2. The child safety seat assembly according to claim 1, wherein the child seat is more reclined in the first state than in the second state.

3. The child safety seat assembly according to claim 1, wherein the shell body includes two elongated arms that are respectively arranged at a left and a right side of the shell body and extend above the upper surface to the first end edge of the shell body.

4. The child safety seat assembly according to claim 3, wherein the adjustable platform includes a support body disposed on the upper surface of the shell body and between the two elongated arms.

5. The child safety seat assembly according to claim 4, wherein the support body is provided with two sockets having guide slots through which the two elongated arms are respectively arranged, the sockets being movable along the elongated arms during adjustment of the adjustable platform relative to the shell body.

6. The child safety seat assembly according to claim 5, wherein at least one of the sockets is assembled with a release button that is operatively connected with the latch mechanism.

7. The child safety seat assembly according to claim 4, wherein the latch mechanism is arranged in a region between the two elongated arms.

8. A safety child seat assembly comprising:
   a detachable child seat having a seatback, and a foremost end opposite to the seatback; and a base including:
  a shell body having a first and a second end edge opposite to each other, a bottom adapted to provide stable resting on a support surface, and at least one elongated arm extending to the first end edge, wherein the first end edge is at a height relative to the bottom that is greater than that of the second end edge, and the shell body extends along a lengthwise axis between the first and second end edges;
  an adjustable platform assembled with the shell body and operable to releasibly attach with the child seat, the adjustable platform including a socket that has a guide slot through which the elongated arm is arranged, the socket being movable along the elongated arm during adjustment of the adjustable platform relative to the shell body; and
  a latch mechanism operable to releasibly lock the adjustable platform with the shell body;
  wherein the adjustable platform and the child seat attached with each other are operable to slide in unison relative to the shell body to cause the foremost end of the child seat to move away and downward from the first end edge of the shell body, a child when sitting on the child seat facing the foremost end, and the foremost end of the child seat remaining between the first and second end edges of the shell body along the lengthwise axis when the foremost end of the child seat moves away and downward from the first end edge of the shell body.

9. The child safety seat assembly according to claim 8, wherein the foremost end of the child seat is movable between a first position near the first end edge of the shell body, and a second position away from and below the first end edge of the shell body, and the child seat is more reclined when the foremost end is in the first position than when the foremost end is in the second position.

10. The child safety seat assembly according to claim 8, wherein the shell body further has an upper surface, the adjustable platform includes a support body disposed on the upper surface, and the latch mechanism is arranged between the upper surface and the support body.

11. The child safety seat assembly according to claim 10, wherein the elongated arm extends above the upper surface of the shell body at an angle relative to the bottom of the shell body.

12. The child safety seat assembly according to claim 8, wherein the socket is assembled with a release button that is operatively connected with the latch mechanism.

13. A child safety seat assembly comprising:
a detachable child seat having a seatback, and a foremost end opposite to the seatback; and
a base including:
  a shell body having a first and a second end edge opposite to each other, a lengthwise axis extending from the first to the second end edge, and a bottom adapted to provide stable resting on a support surface, wherein the first end edge is adjacent to a highest point of the shell body;
  an adjustable platform assembled with the shell body and operable to releasibly attach with the child seat; and
  a latch mechanism operable to releasibly lock the adjustable platform with the shell body;
  wherein the adjustable platform and the child seat attached with each other are operable to slide in unison along the lengthwise axis to displace the foremost end of the child seat either downward and away from the first end edge of the shell body, or upward and toward the first end edge, a child when sitting on the child seat facing the foremost end, and the foremost end of the child seat remaining between the first and second end edges of the shell body along the lengthwise axis when the foremost end of the child seat is displaced downward and away from the first end edge of the shell body or upward and toward the first end edge of the shell body.

14. The child safety seat assembly according to claim 13, wherein the foremost end of the child seat is movable between a first position near the first end edge of the shell body, and a second position away from and below the first end edge of the shell body, and the child seat is more reclined when the foremost end is in the first position than when the foremost end is in the second position.

15. The child safety seat assembly according to claim 13, wherein the shell body includes an upper surface, and two elongated arms that are respectively arranged at a left and a right side of the shell body and extend above the upper surface to the first end edge of the shell body.

16. The child safety seat assembly according to claim 15, wherein the adjustable platform includes a support body disposed on the upper surface of the shell body and between the two elongated arms.

17. The child safety seat assembly according to claim 16, wherein the support body is provided with two sockets having guide slots through which the two elongated arms are respectively arranged, the sockets being movable along the elongated arms during adjustment of the adjustable platform relative to the shell body.

18. The child safety seat assembly according to claim 17, wherein at least one of the sockets is assembled with a release button that is operatively connected with the latch mechanism.

19. The child safety seat assembly according to claim 17, wherein the latch mechanism is arranged in a region between the two elongated arms.

20. The child safety seat assembly according to claim 1, wherein the first end edge of the shell body is configured to abut adjacent to a seatback of a vehicle seat when the child safety seat assembly is installed on the vehicle seat.

* * * * *